(12) United States Patent
Tallman et al.

(10) Patent No.: US 6,904,361 B1
(45) Date of Patent: Jun. 7, 2005

(54) MUNICIPAL UTILITY MAPPING SYSTEM AND METHOD

(75) Inventors: Christopher R. Tallman, Fort Wayne, IN (US); Gary W. Neumann, Fort Wayne, IN (US); Joel T. Holloway, Roanoke, IN (US)

(73) Assignee: Bonar & Associates, Inc., Fort Wayne, IN (US)

( * ) Notice: Subject to any disclaimer, the term of this patent is extended or adjusted under 35 U.S.C. 154(b) by 0 days.

(21) Appl. No.: 10/752,190

(22) Filed: Jan. 6, 2004

(51) Int. Cl.⁷ .............................. G08B 23/00; G09G 5/00
(52) U.S. Cl. .................. 701/208; 345/848; 345/995.19; 340/870.2; 705/8
(58) Field of Search .............................. 701/208, 212, 701/209; 345/848, 995.19, 764, 854, 803; 702/12; 340/870.2, 870.3, 870.7; 342/459, 453, 465, 357.06; 714/796; 395/921; 705/8

(56) References Cited

U.S. PATENT DOCUMENTS

| | | | | |
|---|---|---|---|---|
| 5,214,757 | A | * 5/1993 | Mauney et al. | 715/751 |
| 5,329,464 | A | * 7/1994 | Sumic et al. | 703/1 |
| 5,812,962 | A | 9/1998 | Kovac | |
| 6,272,457 | B1 | * 8/2001 | Ford et al. | 704/9 |
| 2001/0053870 | A1 | * 12/2001 | Ford et al. | 704/9 |
| 2002/0184235 | A1 | * 12/2002 | Young et al. | 707/104.1 |
| 2003/0128865 | A1 | * 7/2003 | White | 382/113 |
| 2004/0049345 | A1 | * 3/2004 | McDonough et al. | 702/12 |
| 2004/0075697 | A1 | * 4/2004 | Maudlin | 345/848 |
| 2004/0128313 | A1 | * 7/2004 | Whyman | 707/103 R |
| 2004/0143810 | A1 | * 7/2004 | Ahmed et al. | 717/100 |
| 2004/0204838 | A1 | * 10/2004 | Chen et al. | 701/209 |

FOREIGN PATENT DOCUMENTS

JP     62109175 A   * 5/1987     G06F/15/62

* cited by examiner

*Primary Examiner*—Thomas G. Black
*Assistant Examiner*—Tuan C To
(74) *Attorney, Agent, or Firm*—Baker & Daniels

(57) ABSTRACT

The computer system and method provides a community map of a plurality of types of utility resources. Software displays a graphic map with visual references to a plurality of types of utility resources. The software also includes instructions that associate data relating to instances of the utility resources and display the data on the display. The method of creating a community map of a plurality of types of utility resources involves associating a plurality of maps of utility resources into a single graphic representation, associating related data with each utility resource; and providing a link between positions on the graphic representation and the associated data that enables display of the associated data when a position on the graphic representation corresponding to a utility resource is activated.

15 Claims, 14 Drawing Sheets

MAP 800

MUNICIPAL UTILITY MAPPING SYSTEM AND METHOD

A portion of the disclosure of this patent document contains material which is the subject to copyright protection, in particular the maps which are contained in the drawings and provided in the High Lake Pros CD ROM Disc containing the following files which are incorporated-by-reference herein

| File Name | Date of Creation | Size |
|---|---|---|
| 2000warranty.pdf | Jul. 9, 2003 | 39 KB |
| 2010 Installation Instructions-11-25-02.pdf | Jul. 8, 2003 | 746 KB |
| 2012 Installation Instructions-11-25-02-REVF.pdf | Jul. 8, 2003 | 712 KB |
| flood-vent2000s.pdf | Jul. 8, 2003 | 108 KB |
| GP 2010-tab.pdf | Jul. 8, 2003 | 1,580 KB |
| GP 2012-tab.pdf | Jul. 8, 2003 | 1,223 KB |
| AdbeRdr60_enu-full.exe | Jun. 6, 2003 | 15,676 KB |
| autorun.inf | May 7, 2002 | 1 KB |
| disck.ico | Feb. 11, 2003 | 3 KB |
| High Lake-PROS.mdb | Jul. 7, 2003 | 1570 KB |
| High Lake Pros.pdf | Jul. 7, 2003 | 89858 KB |
| Image2.gif | Nov. 19, 2003 | 2 KB |
| main.htm | Dec. 11, 2003 | 10 KB |
| menu.htm | Nov. 19, 2003 | 3 KB |
| PROS LOGO.gif | Feb. 28, 2003 | 94 KB |
| search.exe | Apr. 16, 2002 | 19 KB |

The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The invention relates to graphic software. More specifically, the field of the invention is that of map generating software for utilities.

2. Description of the Related Art

Software for creating maps is well known, and such software has been specially adapted for creating maps of utility facilities, such as for sewage, water, electric, transportation systems, etc. For example, one known system creates a map that includes manhole covers and associates separate data records with corresponding codes for the x-y locations on the map. The data records may include test results from the corresponding manhole covers or pictures or video of the same. This allows a graphic display of the map of manhole covers, and for the display of the corresponding data record when the x-y location on the map is activated.

Also, mapping software is known for transportation systems, i.e., road maps. These electronic road maps associate some extraneous data relating to locations on the map, for example the status of construction or the size of the roadway.

However, known systems fail to provide a comprehensive community map of several community resources. Communities, particularly the governmental and management units, are constantly under budgetary pressures while constituents demand constant or improved service conditions.

SUMMARY OF THE INVENTION

The present invention is a community mapping system and method which facilitates management of utility resources. The invention combines a plurality of utility resources on a common map which is linked with relevant associated data. The resulting tool provides the ability to both segregate and aggregate data relating to utility resources to enhance community planning.

The community utilizes the inventive process outlined below to improve the operations of their utilities and manage other features of their communities. Such communities benefit from the integration of the maps and data into an interactive mapping system in the following ways:

Inventory Tool—An asset management program will enable a community to have a record as to the capital assets of a community.

Budgeting Tool—The data gathering process spotlights problems that need to be addressed through identified projects that require planning of community funds. Operation and maintenance tasks can also be tracked to see work performed and the associated costs.

Organizing Tool—Consolidate dispersed hardcopy maps, manuals, reports, forms, video, photographs, and data into one electronic location for quick recall.

Security Tool—By consolidating their information, the community has the ability to recall data needed to manage, assist with, or avoid an emergency situation. By converting paper records to electronic format the community and engineer possess identical backup copies of all the information gathered and consolidated therefore securing the information solely held and maintained by the community.

Accounting Tool—The community will have documented up-to-date information from which to justify and plan for budgeting, billing, and collection of community funds. The community officers will have enhanced reporting capabilities for state and federal agencies for the utilities or other features most notably for GASB-34. GASB-34 or Government Accounting Standards Board statement 34 is an unfunded mandate by the federal government to convert communities accounting standards to the accrual method. GASB-34 relies heavily on knowing the communities capital assets to accurately record the value of those assets.

Operations Program—The equipment, labor, and money associated with operating the community's utilities or other features can be tracked to allow for prioritization of the activities and funds along with the reduction and elimination of inefficiencies in the operations processes.

Maintenance Program—The equipment, labor, and money associated with maintaining the community's utilities or other features can be tracked to allow for prioritization of the activities and funds along with the reduction and elimination of inefficiencies in the maintenance processes.

Level the Playing Field—The interactive mapping system enable small communities with limited resources to have the power tools and capabilities only afforded by larger, more affluent communities.

Saving Time and Money—Through the integration and use of the tools and programs outlined above, the community may identify and correct problems in their utilities or other features that will save them time and effort and in the long term community funds.

The process described below provides communities the chance to take advantage of the nine items previously listed.

The present invention, in one form, relates to a computer system which provides a community map of a plurality of types of utility resources. The computer includes a display, a processor and memory which are coupled to and operate the display. Software associated with the processor contains instructions for displaying a graphic map with visual references to a plurality of types of utility resources. The software also includes instructions that associate data relating to instances of the utility resources and display the data on the display.

The present invention, in another form, is a method of creating a community map of a plurality of types of utility resources which involves associating a plurality of maps of utility resources into a single graphic representation, associating related data with each utility resource; and providing a link between positions on the graphic representation and the associated data that enables display of the associated data when a position on the graphic representation corresponding to a utility resource is activated.

Another aspect of the invention relates to a machine-readable program storage device for storing encoded instructions for a method of creating a community map of a plurality of types of utility resources according to the foregoing method.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
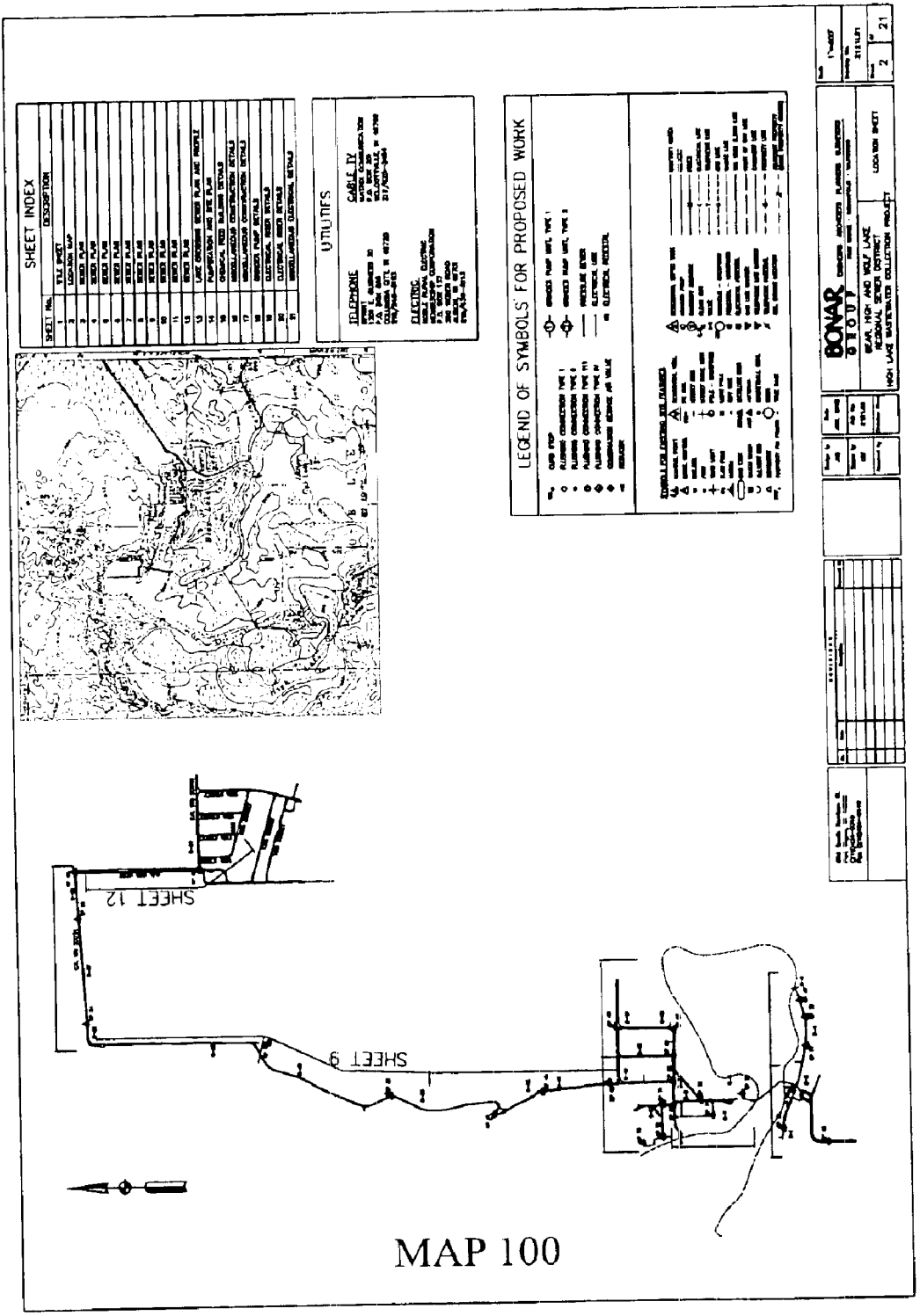
FIGS. 1–13 are maps of a community using the present invention.
Figure 2:
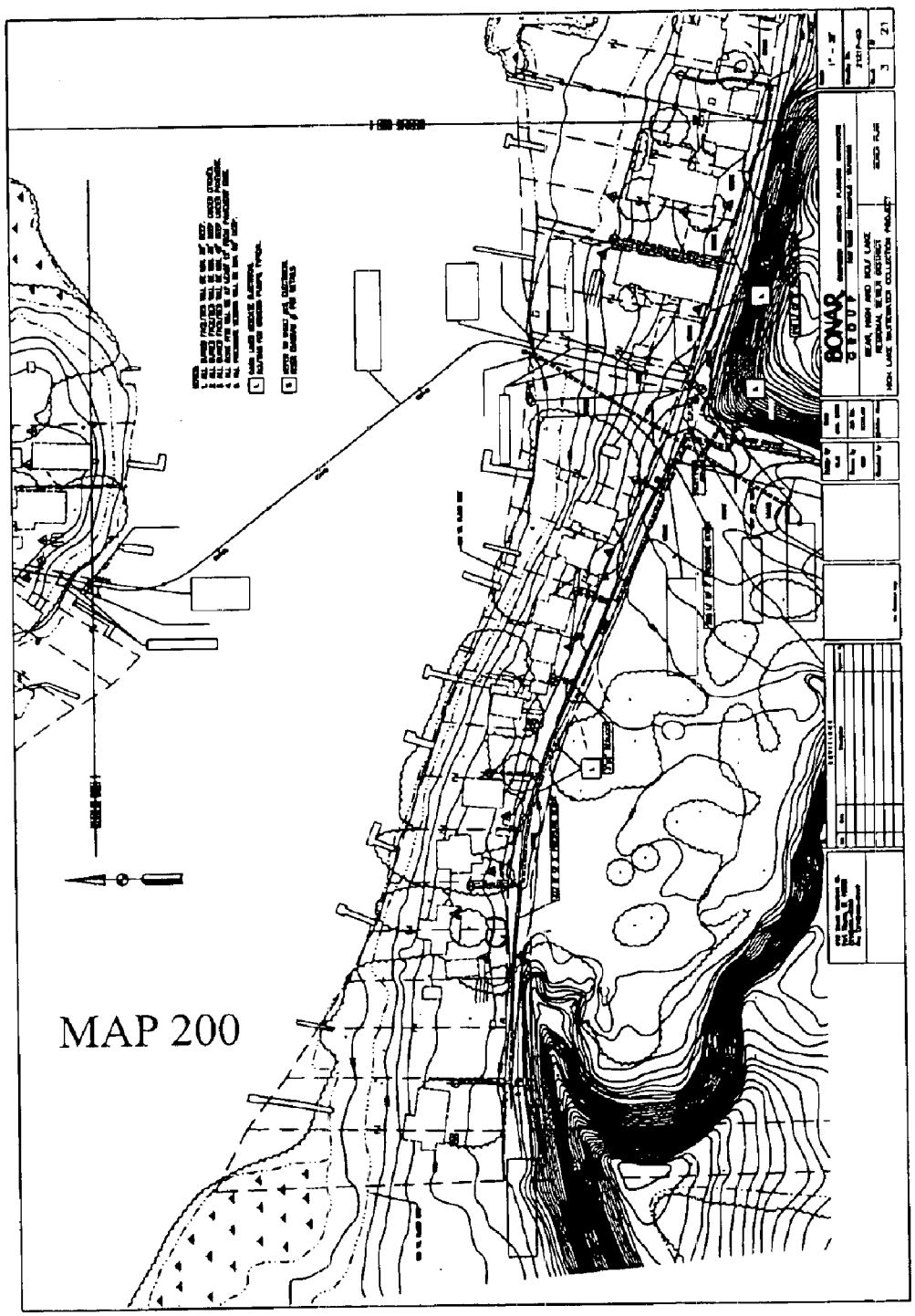
Figure 3:
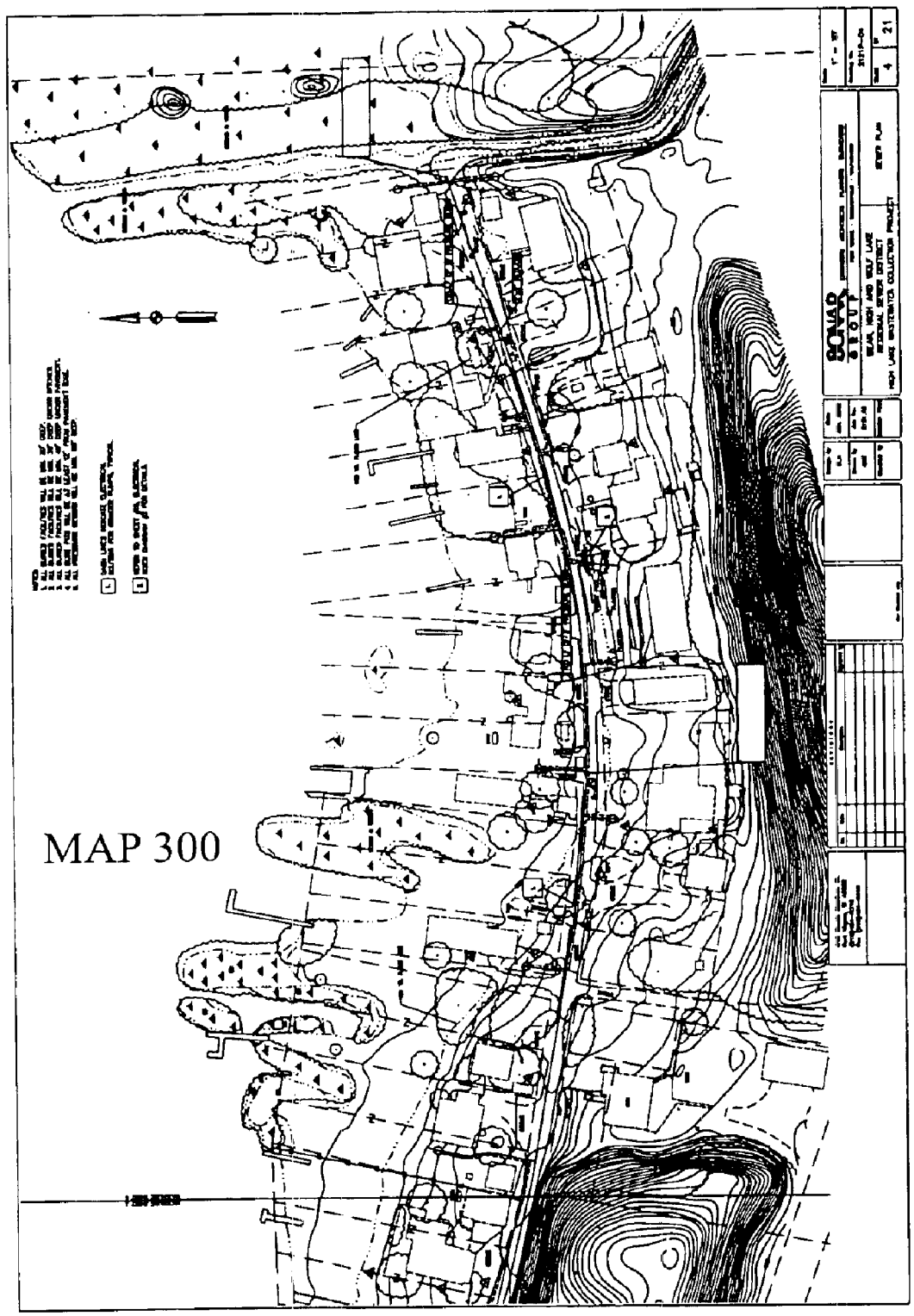
Figure 4:
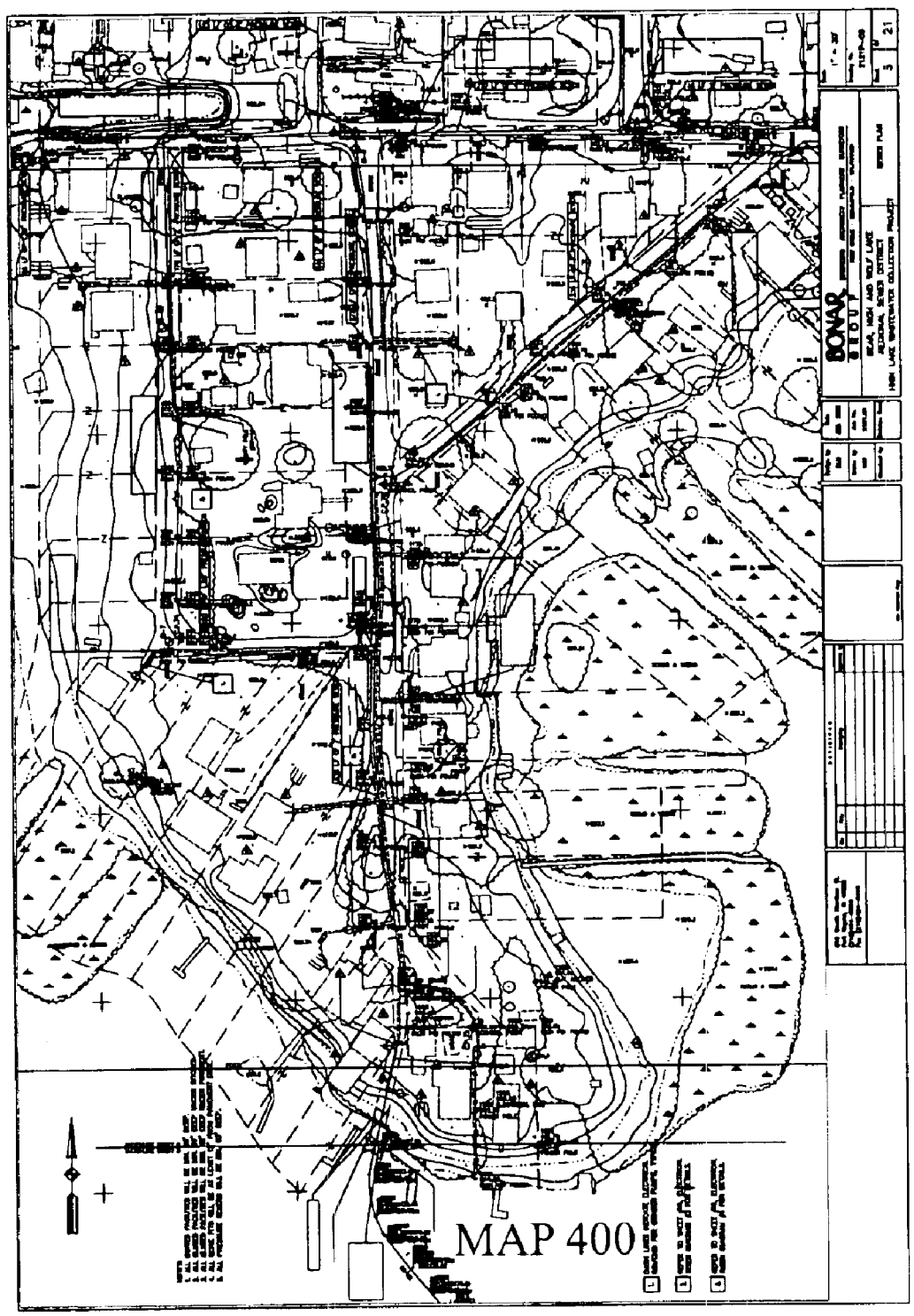
Figure 5:
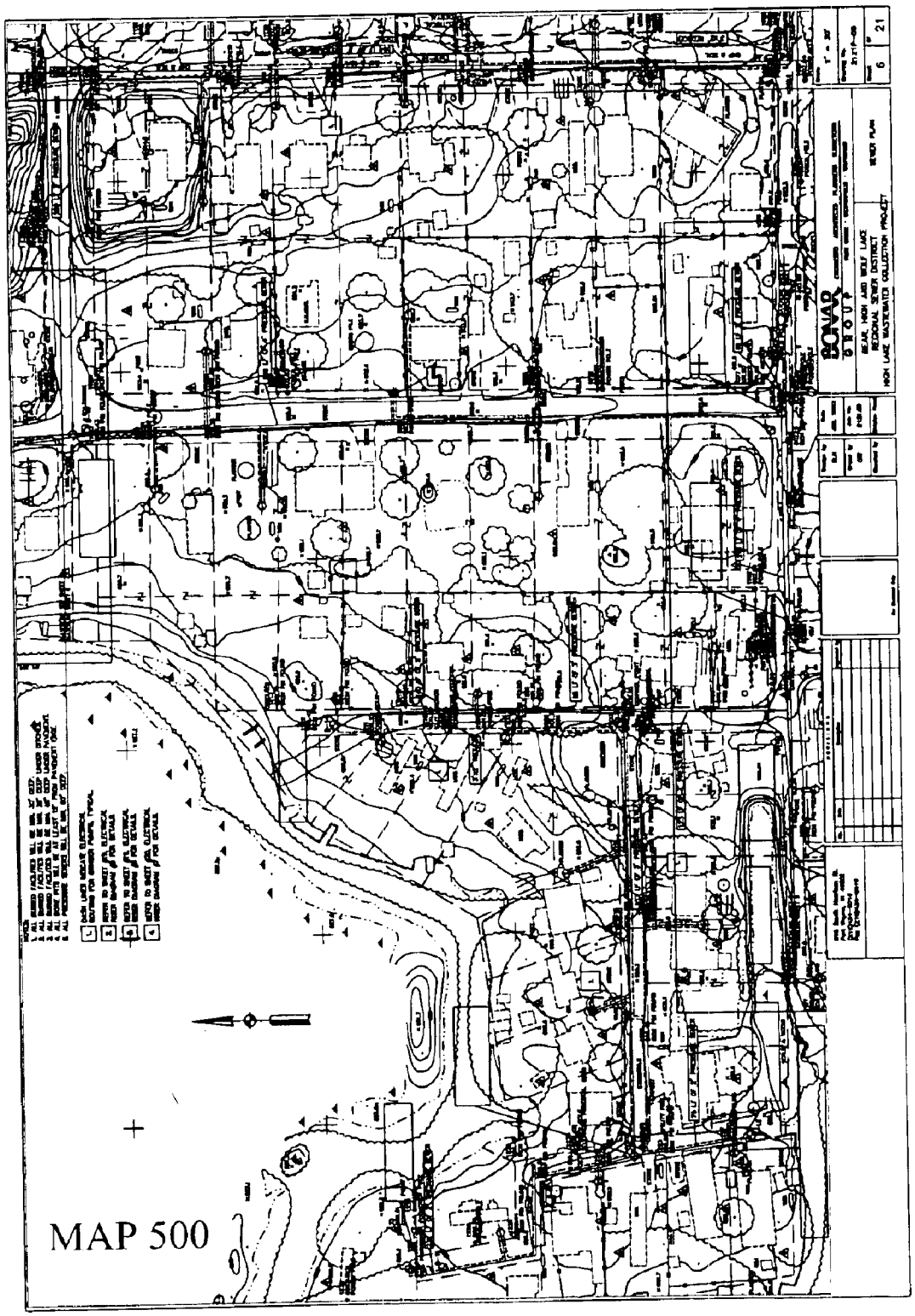
Figure 6:
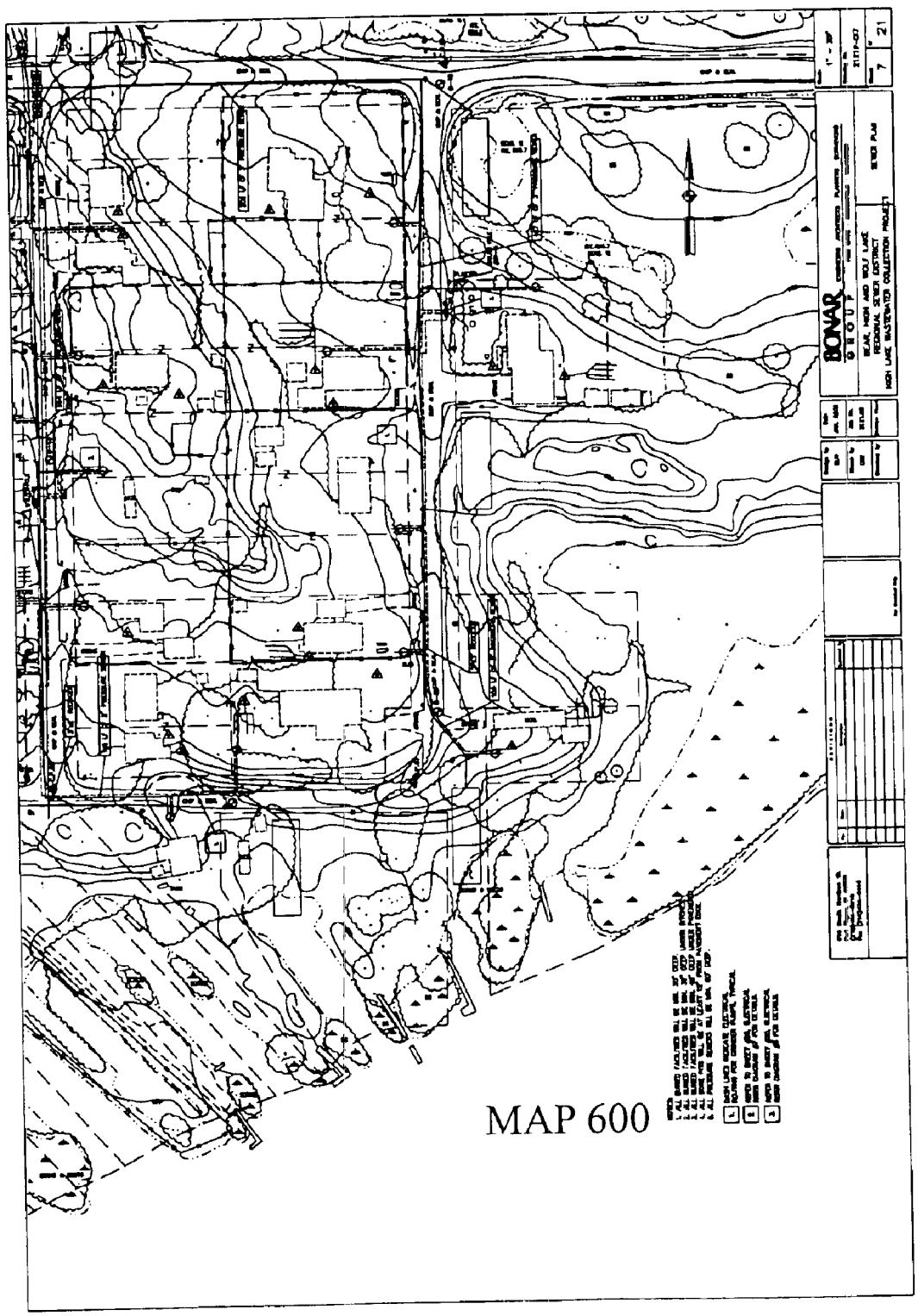
Figure 7:
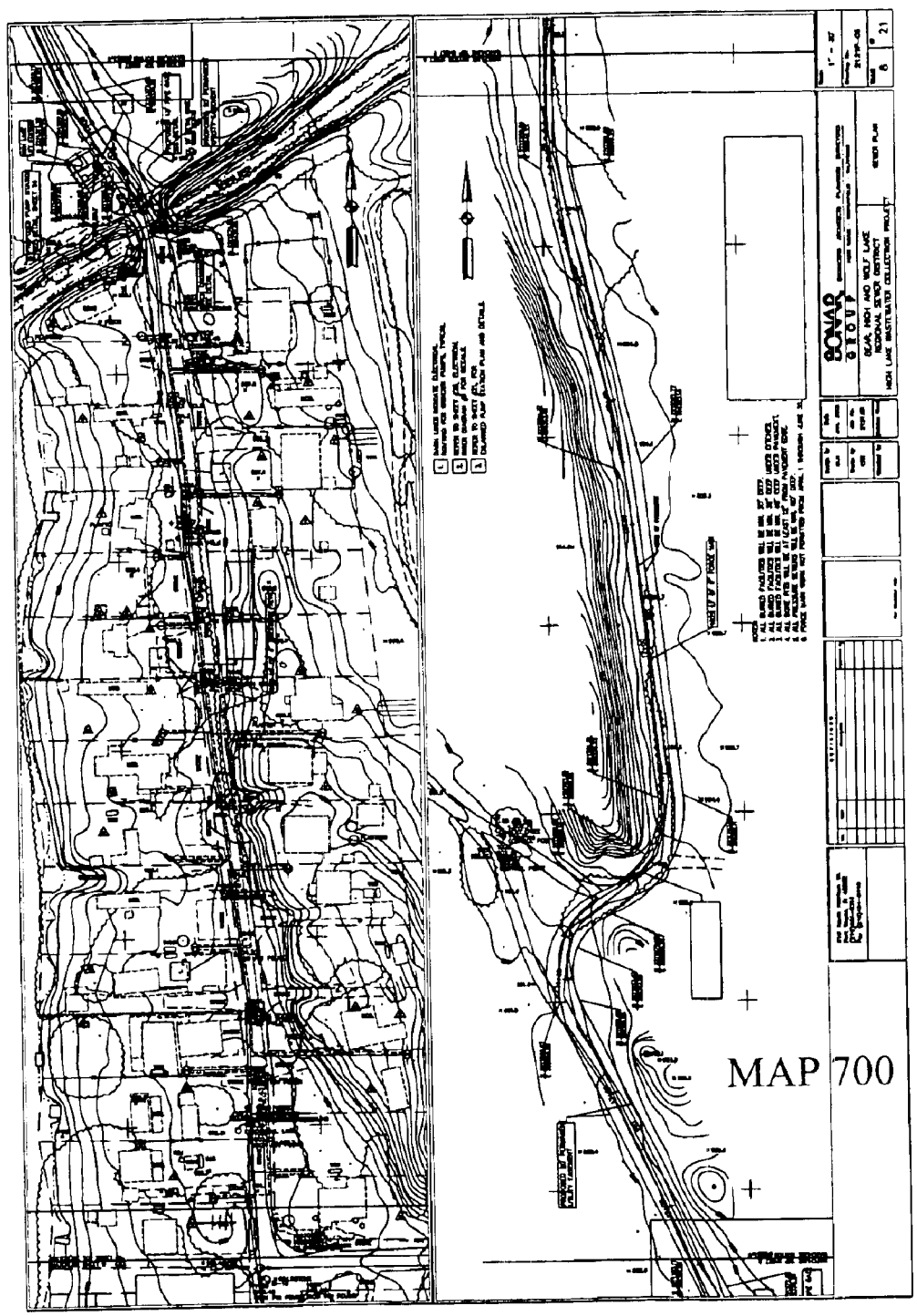
Figure 8:
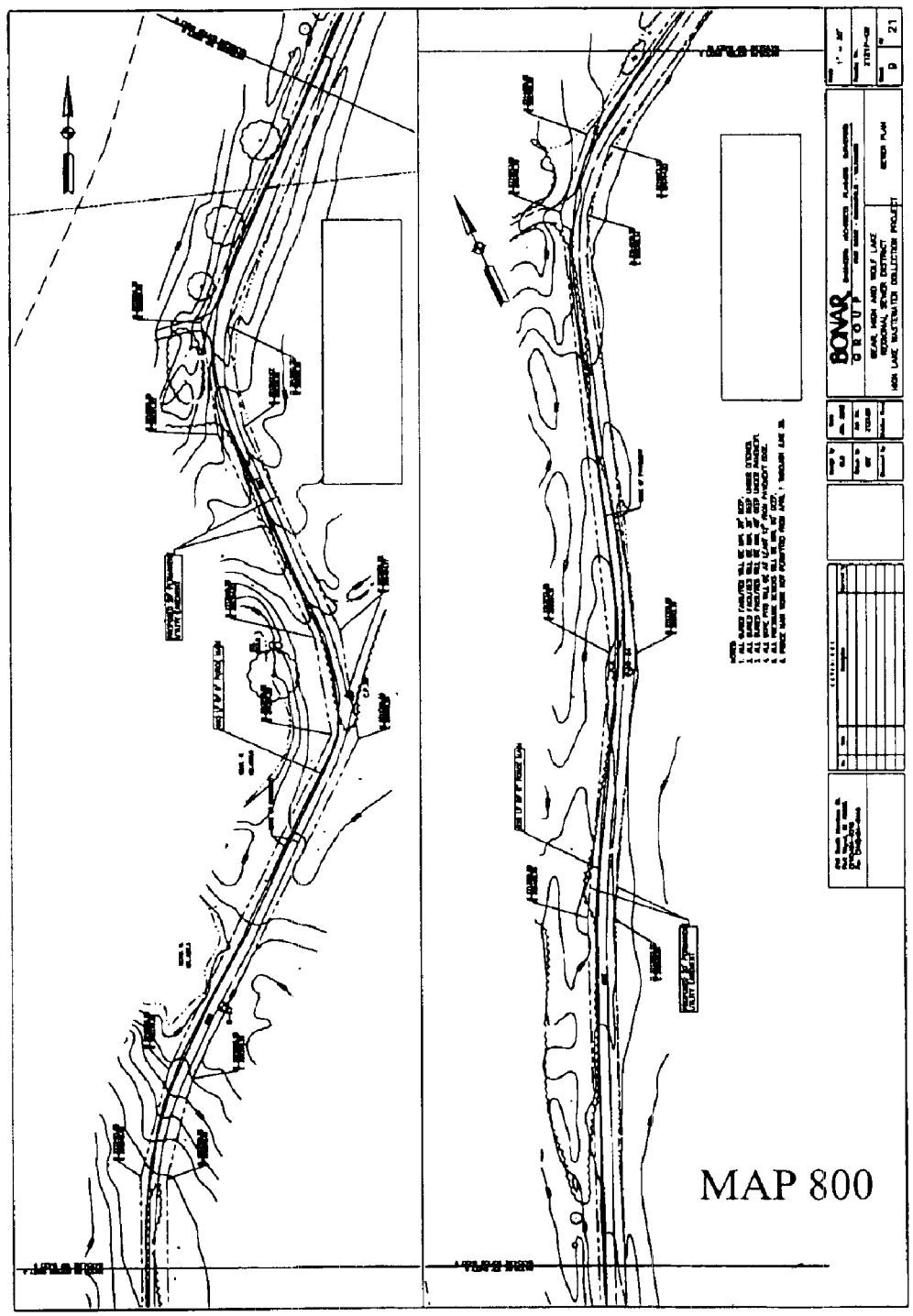
Figure 9:
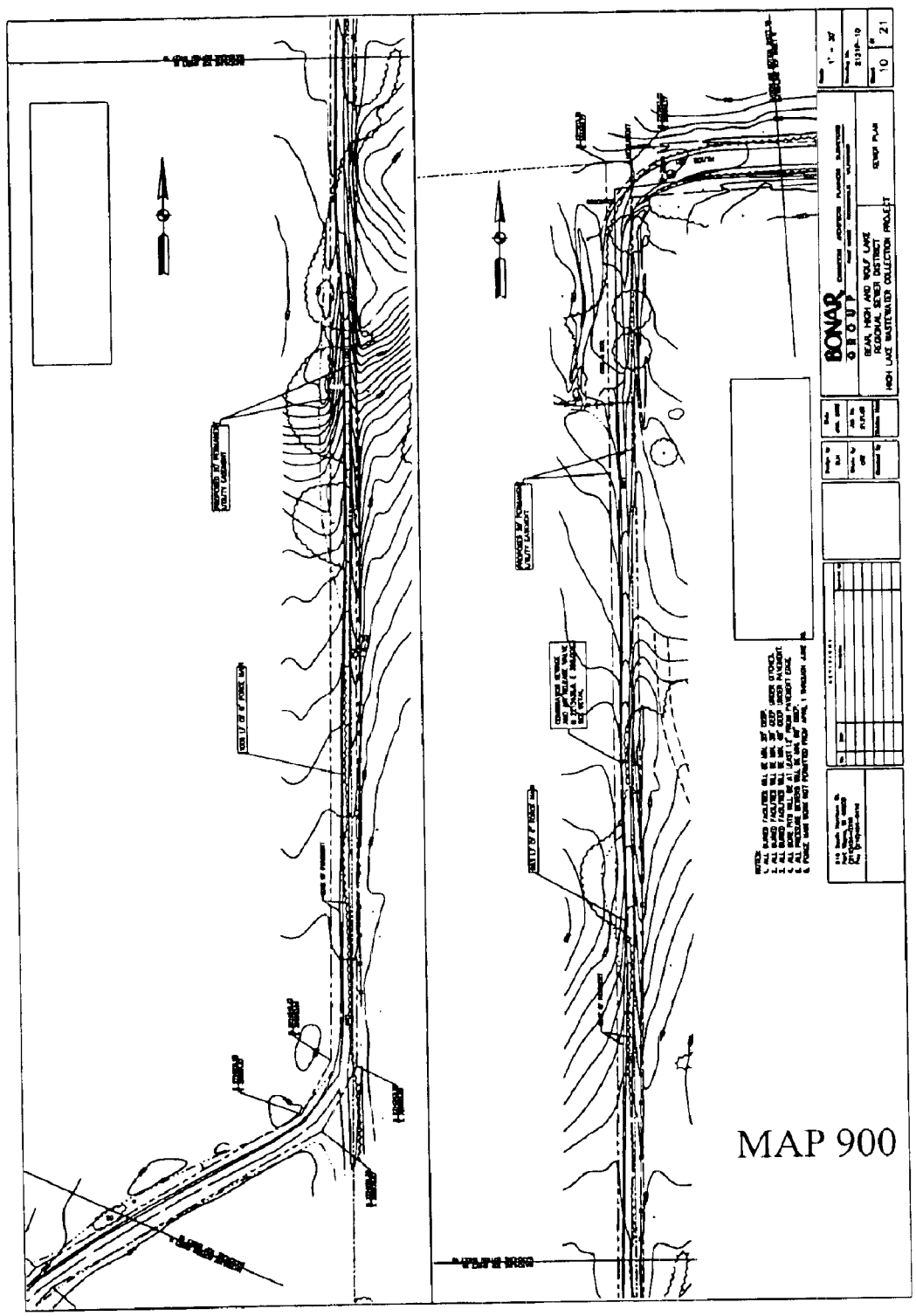
Figure 10:
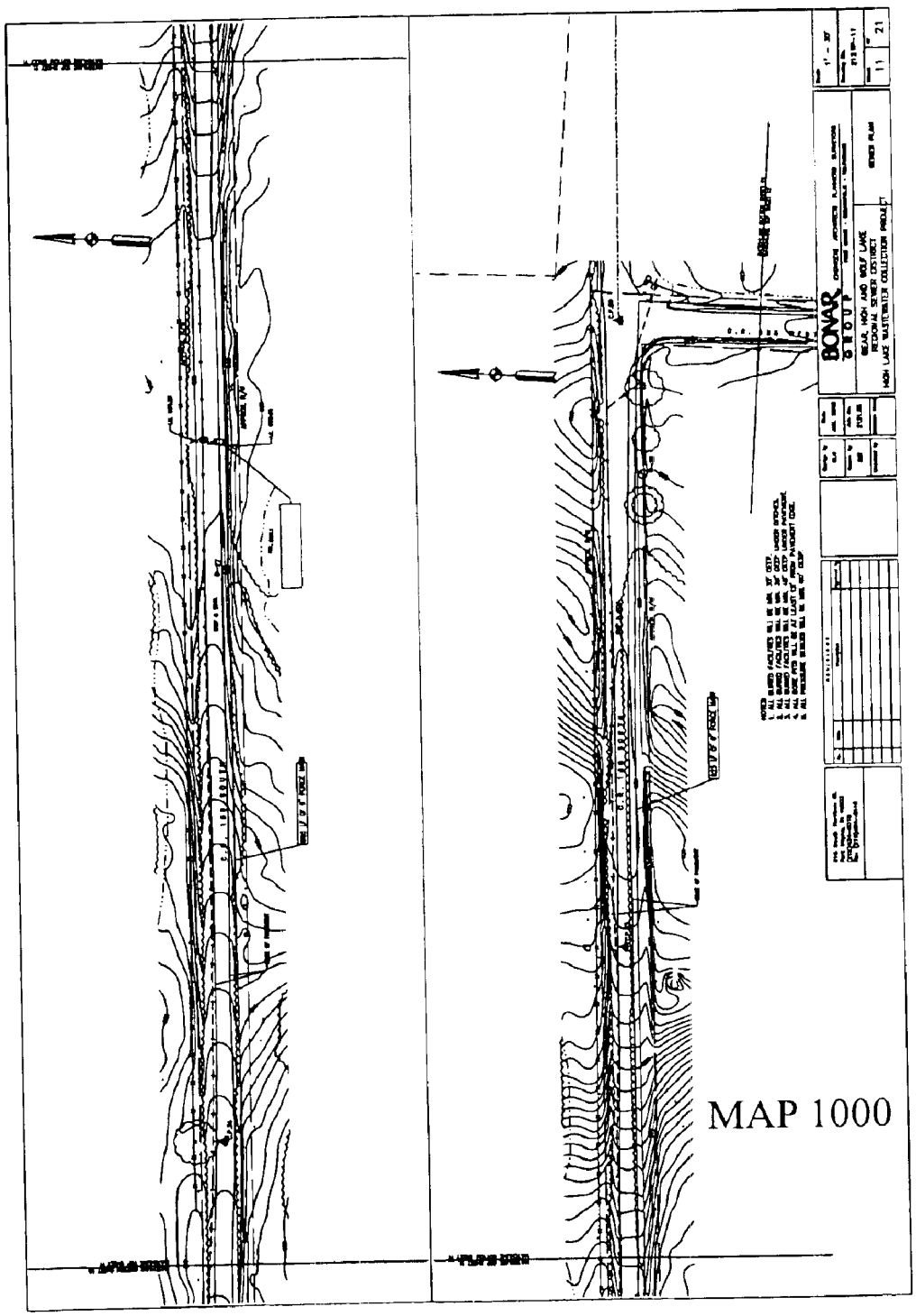
Figure 11:
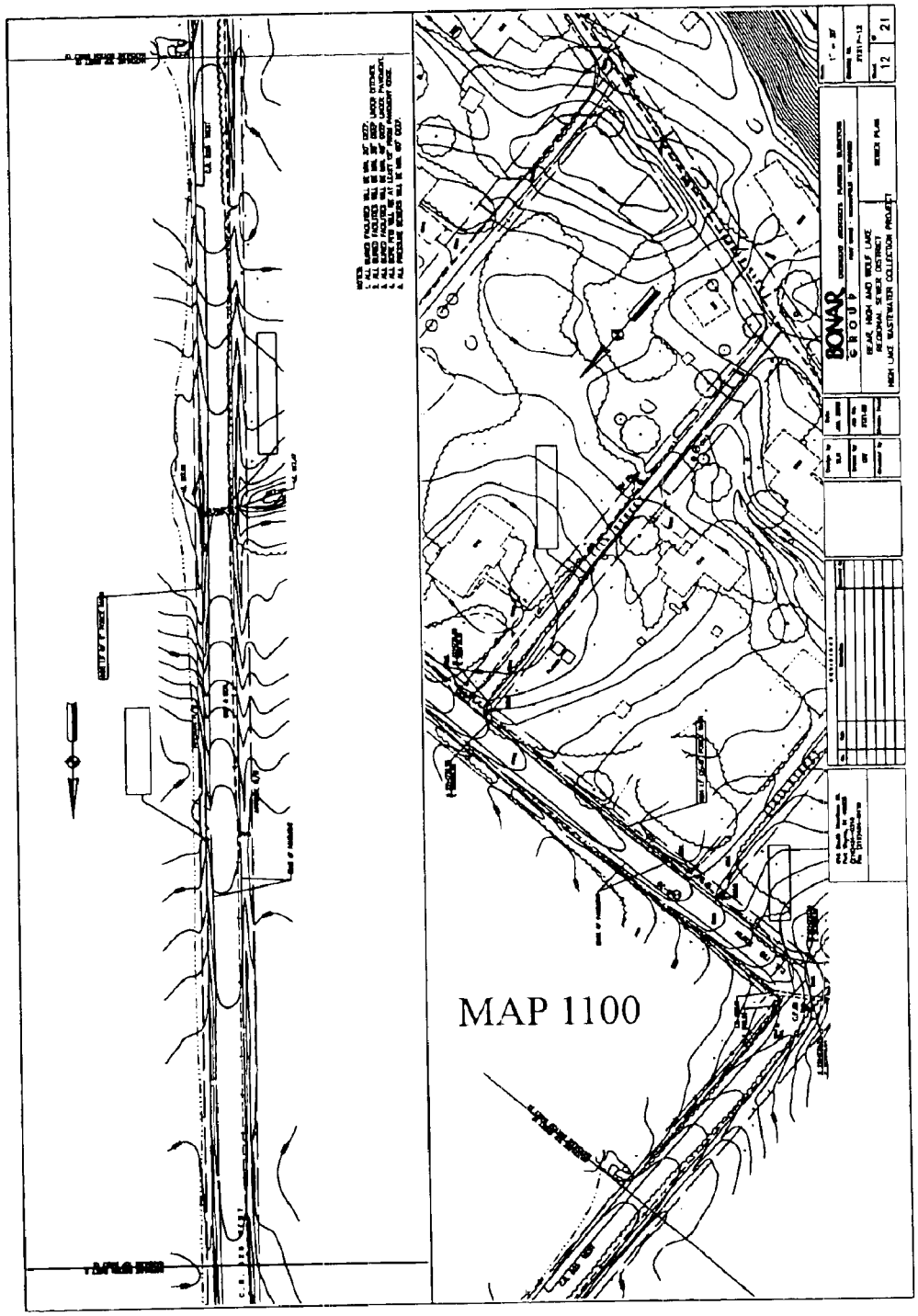
Figure 12:
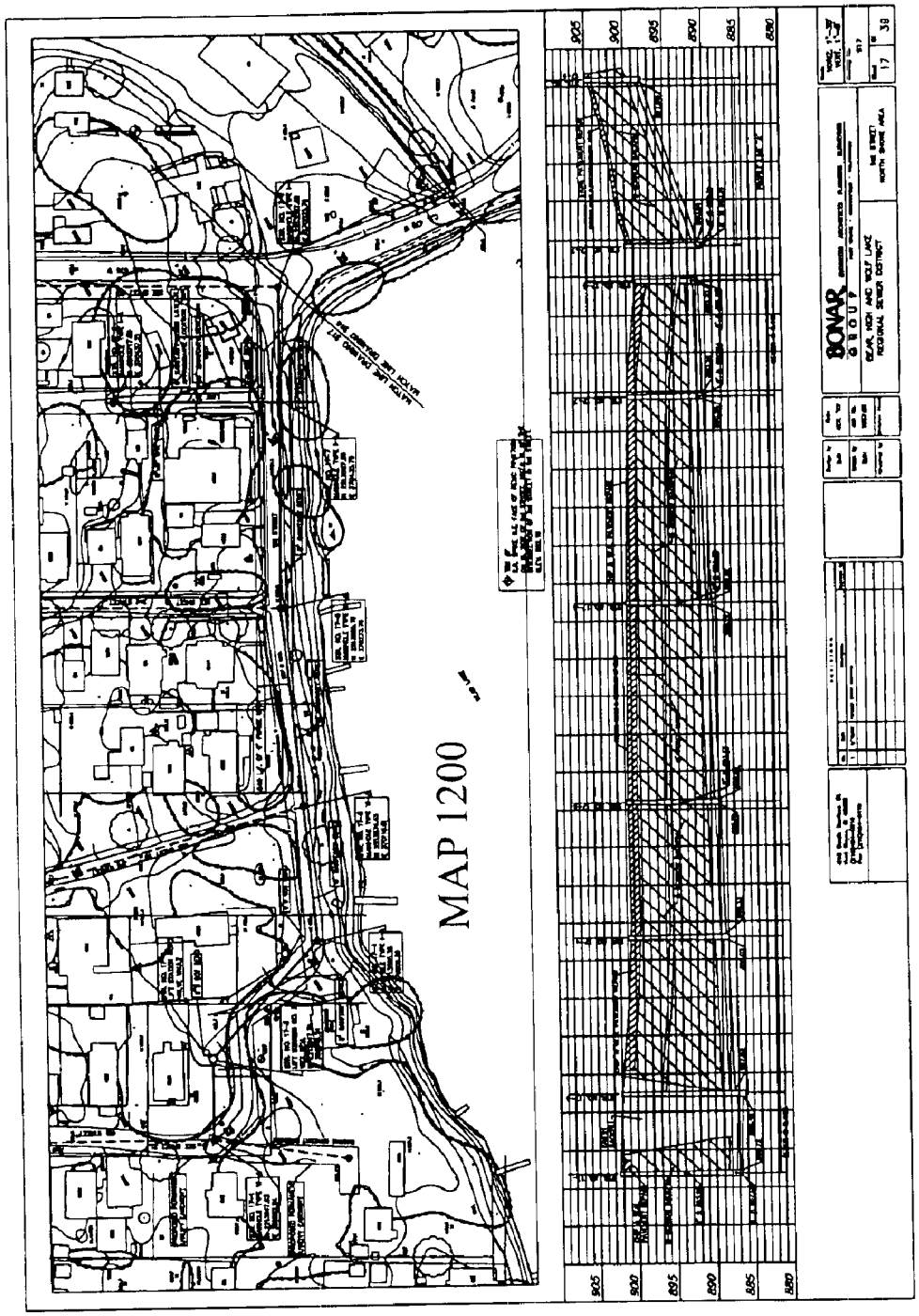

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DESCRIPTION OF THE PRESENT INVENTION

The embodiment disclosed below is not intended to be exhaustive or limit the invention to the precise form disclosed in the following detailed description. Rather, the embodiment is chosen and described so that others skilled in the art may utilize its teachings.

The detailed descriptions which follow are presented in part in terms of algorithms and symbolic representations of operations on data bits within a computer memory representing alphanumeric characters or other information. These descriptions and representations are the means used by those skilled in the art of data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, symbols, characters, display data, terms, numbers, or the like. It should be borne in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems, and are not accessible except through sophisticated software systems. Data structures are not the information content of a memory, rather they represent specific electronic structural elements which impart a physical organization on the information stored in memory. More than mere abstraction, the data structures are specific electrical or magnetic structural elements in memory which simultaneously represent complex data accurately and provide increased efficiency in computer operation.

Further, the manipulations performed are often referred to in terms, such as comparing or adding, commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases the distinction between the method operations in operating a computer and the method of computation itself should be recognized. The present invention relates to a method and apparatus for operating a computer in processing electrical or other (e.g., mechanical, chemical) physical signals to generate other desired physical signals.

The present invention also relates to an apparatus for performing these operations. This apparatus may be specifically constructed for the required purposes or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description below.

The present invention deals with "object-oriented" software, and particularly with an "object-oriented" operating system. The "object-oriented" software is organized into "objects", each comprising a block of computer instructions describing various procedures ("methods") to be performed in response to "messages" sent to the object or "events" which occur with the object. Such operations include, for example, the manipulation of variables, the activation of an object by an external event, and the transmission of one or more messages to other objects.

Messages are sent and received between objects having certain functions and knowledge to carry out processes. Messages are generated in response to user instructions, for example, by a user activating an icon with a "mouse" pointer generating an event. Also, messages may be generated by an object in response to the receipt of a message. When one of the objects receives a message, the object carries out an operation (a message procedure) corresponding to the message and, if necessary, returns a result of the operation. Each object has a region where internal states (instance variables)

of the object itself are stored and where the other objects are not allowed to access. One feature of the object-oriented system is inheritance. For example, an object for drawing a "circle" on a display may inherit functions and knowledge from another object for drawing a "shape" on a display.

A programmer "programs" in an object-oriented programming language by writing individual blocks of code each of which creates an object by defining its methods. A collection of such objects adapted to communicate with one another by means of messages comprises an object-oriented program. Object-oriented computer programming facilitates the modeling of interactive systems in that each component of the system can be modeled with an object, the behavior of each component being simulated by the methods of its corresponding object, and the interactions between components being simulated by messages transmitted between objects.

An operator may stimulate a collection of interrelated objects comprising an object-oriented program by sending a message to one of the objects. The receipt of the message may cause the object to respond by carrying out predetermined functions which may include sending additional messages to one or more other objects. The other objects may in turn carry out additional functions in response to the messages they receive, including sending still more messages. In this manner, sequences of message and response may continue indefinitely or may come to an end when all messages have been responded to and no new messages are being sent. When modeling systems utilizing an object-oriented language, a programmer need only think in terms of how each component of a modeled system responds to a stimulus and not in terms of the sequence of operations to be performed in response to some stimulus. Such sequence of operations naturally flows out of the interactions between the objects in response to the stimulus and need not be preordained by the programmer.

Although object-oriented programming makes simulation of systems of interrelated components more intuitive, the operation of an object-oriented program is often difficult to understand because the sequence of operations carried out by an object-oriented program is usually not immediately apparent from a software listing as in the case for sequentially organized programs. Nor is it easy to determine how an object-oriented program works through observation of the readily apparent manifestations of its operation. Most of the operations carried out by a computer in response to a program are "invisible" to an observer since only a relatively few steps in a program typically produce an observable computer output.

In the following description, several terms which are used frequently have specialized meanings in the present context. The term "object" relates to a set of computer instructions and associated data which can be activated directly or indirectly by the user. The terms "windowing environment", "running in windows", and "object oriented operating system" are used to denote a computer user interface in which information is manipulated and displayed on a video display such as within bounded regions on a raster scanned video display. The terms "network", "local area network", "LAN", "wide area network", or "WAN" mean two or more computers which are connected in such a manner that messages may be transmitted between the computers. In such computer networks, typically one or more computers operate as a "server", a computer with large storage devices such as hard disk drives and communication hardware to operate peripheral devices such as printers or modems. Other computers, termed "workstations", provide a user interface so that users of computer networks can access the network resources, such as shared data files, common peripheral devices, and inter-workstation communication. Users activate computer programs or network resources to create "processes" which include both the general operation of the computer program along with specific operating characteristics determined by input variables and its environment.

The terms "desktop", "personal desktop facility", and "PDF" mean a specific user interface which presents a menu or display of objects with associated settings for the user associated with the desktop, personal desktop facility, or PDF. When the PDF accesses a network resource, which typically requires an application program to execute on the remote server, the PDF calls an Application Program Interface, or "API", to allow the user to provide commands to the network resource and observe any output. The term "Browser" refers to a program which is not necessarily apparent to the user, but which is responsible for transmitting messages between the PDF and the network server and for displaying and interacting with the network user. Browsers are designed to utilize a communications protocol for transmission of text and graphic information over a world wide network of computers, namely the "World Wide Web" or simply the "Web". Examples of Browsers compatible with the present invention include the Navigator program sold by Netscape Corporation and the Internet Explorer sold by Microsoft Corporation (Navigator and Internet Explorer are trademarks of their respective owners). Although the following description details such operations in terms of a graphic user interface of a Browser, the present invention may be practiced with text based interfaces, or even with voice or visually activated interfaces, that have many of the functions of a graphic based Browser.

Browsers display information which is formatted in a Standard Generalized Markup Language ("SGML") or a HyperText Markup Language ("HTML"), both being scripting languages which embed non-visual codes in a text document through the use of special ASCII text codes. Files in these formats may be easily transmitted across computer networks, including global information networks like the Internet, and allow the Browsers to display text, images, and play audio and video recordings. The Web utilizes these data file formats to conjunction with its communication protocol to transmit such information between servers and workstations. Browsers may also be programmed to display information provided in an eXtensible Markup Language ("XML") file, with XML files being capable of use with several Document Type Definitions ("DTD") and thus more general in nature than SGML or HTML. The XML file may be analogized to an object, as the data and the stylesheet formatting are separately contained (formatting may be thought of as methods of displaying information, thus an XML file has data and an associated method).

The terms "personal digital assistant" or "PDA", as defined above, means any handheld, mobile device that combines computing, telephone, fax, e-mail and networking features. The terms "wireless wide area network" or "WWAN" mean a wireless network that serves as the medium for the transmission of data between a handheld device and a computer. The term "synchronization" means the exchanging of information between a handheld device and a desktop computer either via wires or wirelessly. Synchronization ensures that the data on both the handheld device and the desktop computer are identical.

In wireless wide area networks, communication primarily occurs through the transmission of radio signals over analog, digital cellular, or personal communications service ("PCS") networks. Signals may also be transmitted through microwaves and other electromagnetic waves. At the present time, most wireless data communication takes place across cellular systems using second generation technology such as code-division multiple access ("CDMA"), time division multiple access ("TDMA"), the Global System for Mobile Communications ("GSM"), personal digital cellular ("PDC"), or through packet-data technology over analog systems such as cellular digital packet data (CDPD") used on the Advance Mobile Phone Service ("AMPS"). The terms "wireless application protocol" or "WAP" mean a universal specification to facilitate the delivery and presentation of web-based data on handheld and mobile devices with small user interfaces.

The present invention relates to utility resources for communities. As used in this application, utility resources may include sanitary sewage systems, stormwater systems, water purification and distribution systems, vehicle transportation systems, electric delivery systems, telecommunications systems, and components thereof. For example, a water distribution system may have components such as piping (including size and material information), hydrants, valves, booster stations, storage facilities, production wells, etc. Another example of utility components for a sanitary sewer system includes pipes (including invert, diameter, and material information), manholes, inlets, catch basins, lift stations, and combined sewer overflow (CSO). In the context of transportation systems, components may include signs, pavement types, drainage structures, costs, and dates of service. Each of these components may have related information such as condition and location information, in addition to observed operational values (e.g., flow rates, weight capacities, etc.). Operational valves may be historical data tables associated with a utility component, and optionally may include a live link (e.g., wireless transmission of a sensor of the utility resource) to the utility component.

The term "community" is used in this application as a short hand for a geographic, legal, and/or operational grouping of utilities. Typically these communities are related to an incorporated municipal unit, although the term community encompasses any grouping of utility and geographic regions that are desired to be managed, for example a subdivision or a housing development as well as cities and towns. In addition, the present invention may also be used to manage utility resources of a building infrastructure or a factory, in which case the term "community" as used in this application would extend to buildings or factories.

The invention relates to the creation of a graphic database which incorporates utility maps and other related information into a computer accessible map and data collection to provide a management tool for utility systems of communities. The map includes a plurality of utility features overlaid on a conventional geographic and/or street map. In addition to the graphic depiction of the map, the utility features also have associated data which may be in the form of inventory descriptions, photographic or video depictions, cost and/or operations information. This additional information may be entered and/or imported from existing records, or may be determined as a result of further investigation relating to utility resources. The process starts by first creating the graphic map and then associating such additional data with the objects on the map as appropriate for the community involved and its management objectives.

The first step is to generate a graphic representation, for example an AutoCAD® drawing, representing a map of the community, for example by using Autodesk® Map 5 software (Autodesk and AutoCAD are either registered trademarks or trademarks of Autodesk, Inc., in the USA and/or other countries). Such a map may contain the following layer combinations and may be printed using a plot style with the color palette designated:

| LAYERNAME | LAYER DESCRIPTION | COLOR | PLOT COLOR |
|---|---|---|---|
| ADDR | ADDRESS | 7 | 8 |
| AERIAL | AERIAL IMAGE | 7 | 7 |
| AERIALTXT | AERIAL IMAGE TEXT | 7 | 7 |
| AIRPORT | AIRPORT | 11 | 11 |
| AIRVALVSTRTXT | AIR VALVE STRUCTURE TEXT | 100 | 100 |
| ALLEYRW | ALLEY RIGHT-OF-WAY | 25 | 7 |
| BORDER | DRAWING BORDER/TITLE BLOCK | 7 | 7 |
| CENTERLINE | ROAD CENTERLINE | 2 | 7 |
| CONTHGH | TOPOGRAPHY LINES AND TEXT 5 | 200 | 200 |
| CONTNML | TOPOGRAPHY LINES AND TEXT 1 | 252 | 252 |
| CORP | CORPORATION LIMITS | 154 | 154 |
| CORPTXT | CORPORATION LIMIT TEXT | 154 | 154 |
| CULV | CULVERT LINES | 124 | 124 |
| CULVTXT | CULVERT LINES TEXT | 124 | 124 |
| EASE | EASEMENTS | 54 | 54 |
| EASETXT | EASEMENT TEXT | 52 | 52 |
| FIBER OPTIC | FIBER OPTIC | 211 | 211 |
| FLUSHCONSTRTXT | FLUSH CONNECTION STRUCTURE TEXT | 100 | 100 |
| FRM | FORCEMAIN LINES | 66 | 66 |
| FRMTXT | FORCEMAIN TEXT | 62 | 62 |
| GAS | GAS UTILITY LINE/ COMPONENTS | 30 | 30 |
| GASTXT | GAS UTILITY TEXT | 40 | 40 |
| GRINDERSTRTXT | GRINDER STRUCTURE TEXT | 100 | 100 |
| LEGENDSEW | SEWER SYMBOL LEGEND | 7 | 7 |
| LEGENDWTR | WATER SYMBOL LEGEND | 7 | 7 |
| LPOLETXT | LIGHT POLE TXT | 240 | 240 |
| LPOLE | LIGHT POLE COMPONENTS | 242 | 242 |
| N_ARR | NORTH ARROW | 4 | 4 |
| PARCEL NUMBERS | PARCEL NUMBERS | 52 | 52 |
| PLAT | PLAT LINE | 12 | 7 |
| PLATTXT | PLAT TEXT | 195 | 195 |
| PPOLETXT | POWER POLE TEXT | 10 | 10 |
| PPOLE | POWER POLE COMPONENTS | 12 | 12 |
| RAILROAD | RAILROAD | 184 | 184 |
| RDCON_P | ROAD CONDITION POOR | 1 | 1 |
| RDCON_A | ROAD CONDITION AVERAGE | 2 | 31 |
| RDCON_G | ROAD CONDITION GOOD | 4 | 4 |
| RDDIM | ROAD DIMENSIONS | 21 | 21 |
| RW | RIGHT-OF-WAY LINE | 24 | 7 |
| RWTXT | RIGHT-OF-WAY TEXT | 24 | 7 |
| SANCON_P | SANITARY LINE CONDITION POOR | 1 | 1 |
| SANCON_A | SANITARY LINE CONDITION AVERAGE | 2 | 31 |
| SANCON_G | SANITARY LINE CONDITION GOOD | 4 | 4 |
| SANSTRTXT | SANITARY STRUCTURE TEXT | 100 | 100 |
| SANTXT | SANITARY SEWER TEXT | 100 | 100 |
| SAN | SANITARY SEWER LINE | 102 | 102 |
| SHTNUMB | SHEET NUMBER | 250 | 250 |
| STREET | STREET LINE | 14 | 14 |
| STNAME | STREET NAME TEXT | 127 | 7 |
| STMCON_P | STORM LINE CONDITION POOR | 1 | 1 |
| STMCON_A | STORM LINE CONDITION AVERAGE | 2 | 31 |
| STMCON_G | STORM LINE CONDITION GOOD | 4 | 4 |
| STMSTRTXT | STORM SEWER STRUCTURE TEXT | 103 | 103 |
| STMTXT | STORM SEWER TEXT | 103 | 103 |
| STM | STORM SEWER LINE/ COMPONENTS | 105 | 105 |

-continued

| LAYERNAME | LAYER DESCRIPTION | PLOT COLOR | COLOR |
|---|---|---|---|
| TOPO-HGH | TOPOGRAPHY LINES & TEXT | 252 | 252 |
| TOPO-NML | TOPOGRAPHY LINES & TEXT | 200 | 200 |
| VPORT | VIEWPORT | 244 | 244 |
| WTR-BODY | RIVER, STREAM, LAKE, ETC. LINES & TEXT | 174 | 174 |
| WTRCON_P | WATER LINE CONDITION POOR | 1 | 1 |
| WTRCON_A | WATER LINE CONDITION AVERAGE | 2 | 31 |
| WTRCON_G | WATER LINE CONDITION GOOD | 4 | 4 |
| WTR | WATER LINE | 5 | 150 |
| WTRTXT | WATER UTILITY TEXT | 142 | 142 |
| HYDTXT | FIRE HYDRANT TEXT | 142 | 142 |
| VALVTXT | WATER VALVE TEXT | 142 | 142 |

Existing hard copy maps or existing electronic map versions from the community are used to generate the final mapping component for the interactive mapping system. Each community map may contain points and lines denoting right-of-way and/or edge of pavement lines with road or street name and/or number designations. Appropriate utilities and/or relevant features appropriate for the project may be incorporated into the community map using symbols defined in a legend. A community map is composed of and divided into multiple maps depicting the greater detail to be shown for each utility or feature. The map may consist of images, pictures, electronic drawings, or a combination of all three. Upon completion, maps required for a graphic representation of the utility or feature data may printed into a graphic display format, for example an Adobe® PDF (Portable Document Format) viewable by Adobe® Acrobat® (Adobe and Acrobat are either registered trademarks or trademarks of Adobe Systems Incorporated in the United States and/or other countries). The map allows the client a geographical reference to points of interest in the depicted community.

The second step involves creating data relating to the points of interest on the depicted community. This process starts by establishing a table with fields appropriate for the depicted community. A table contains a unique set of data fields as identified by the party managing the community with guidance from the engineer. These fields may be populated by importing an electronic version from another software format (example Microsoft® Excel, Microsoftis either a registered trademark or trademark of Microsoft Corporation in the United States and/or other countries). If an electronic version of the data does not exist then the data is entered from previously established field forms. A different table may be created for each utility or feature being considered. The fields established in each table are shown in a report(s) as described below. Several examples of the data fields that may be used are as follows.

Sewer Inventory: STRUCTURES
DATE—Date on which the inventory was done.
STRUCTURE ID—Assigned identification number if not already done
GROUP—General description of component (Manhole, Catch Basin)
GROUP CONDITION—Physical condition of component (fair, poor)
MATERIAL—Material component is made of (pvc, concrete)
SHAPE—(round, square)
DIMENSIONS—(length, width, diameter)
CASTING—Type of casting on component
CASTING CONDITION—(poor, good)
INCOMING PIPES and OUTFALL PIPES
STRUCTURE I.D.—Assigned identification number on upstream or downstream component
MATERIAL—Material component is made of (pvc, rcp)
DIMENSION—Diameter or dimensions of pipe
DEPTH—Measured distance from top of casting to invert of pipe
Water Inventory: HYDRANTS
DATE—Date on which the inventory was done.
STRUCTURE ID—Assigned identification number if not already done
MANUFACTURER—Manufacturer of the hydrant
DATE INSTALLED—Date in which the component was originally installed
LOCATION—General area in which the component is located
MAIN SIZE—Size in inches of the water main or hydrant is attached to.
AUXILIARY VALVE—Denotes whether the hydrant has an auxiliary valve
COLOR—In-field painted color of hydrant
HYDRANT SIZE—Stamped size on hydrant by manufacturer
OPENS—Indicates which way hydrant opens
NOZZLES—Number of pumper or hose nozzles
NOZZLE SIZE—Size of pumper and hose nozzles
GRASS AREA—Is component in a grass area
PAVED AREA (TYPE)—Is component in paved area
GPS COORDINATES—Location of component using Global Coordinates
VALVES
STRUCTURE ID—Assigned identification number if not already done
MANUFACTURER—Manufacturer of the valve
DATE INSTALLED—Date in which the component was originally installed
LOCATION—General area in which the component is located
SIZE—Size in inches of the water main valve
TYPE—(gate, butterfly, altitude control)
VALVE PIT—Indicates if the valve is housed in a pit
VALVE PIT SIZE—Dimensions in feet of valve pit
GRASS AREA—Is component in a grass area
PAVED AREA (TYPE)—Is component in paved area
BACKFLOW PREVENTOR—Backflow Prevention device
GPS COORDINATES—Location of component using Global Coordinates To facilitate the data entry, the invention contemplates creation of electronic forms to efficiently capture any data entry. Fields within a table may be populated with the data from the community utility or relevant feature. Data may be manually entered into the electronic form, or converted from an electronic form as appropriate. An electronic form may be created to match the layout of a field data sheet created for data entry by field crews examining the actual utility structures. The layout of the electronic form may or may not match the report layouts. However, the fields are designed to be compatible so that either direct transfer or a conversion may quickly populate the data fields.

Once the data is entered for the map, customized reports may be designed to facilitate the management objectives of the community. Such reports may replicate an existing form or a new form may be generated displaying the information either entered into an electronic form or imported from another electronic format. These reports clearly and easily convey information contained in the tables into a readily understood format. The report may be the image displayed to a user in the final interactive map after they point and click on the item of interest.

The complex amount of data stored in the map may not be relevant for every aspect of a management objective. To provide reports and maps that are tailored for the management objective, queries may be defined to restrict the amount of information presented. Such queries reduce the immense amount of information contained in the tables down to a few selected fields of interest. Any field established in the tables can be a part of the query.

One method of data entry is to obtain hard copies of the forms created for data entry for the community. This involves individuals inspecting, gathering, and recording the information for each component on a hard copy form. For example in obtaining data on a community, this may involve opening every sewer structure down to reading the information from the fire hydrant mold. The data collection may be performed by any suitably trained individual, and the resulting information may be used by an engineer to solve a utility management problem.

Thus, the map includes various graphic and data objects which may be linked with a software implemented link tool to link unique reports generated in the database, pictures, or video to the corresponding map or image from where the information should be recalled. A point and click system will be utilized. Such a link tool is a feature provided by Adobe® Acrobat® to allow images to be tied together, and is well known in the art.

In addition to setting up appropriate links, tag items may also be associated with objects to enable text searches. The Adobe® Acrobat feature is done using the following commands. Edit-Preferences-Catalog-Tags-Add exact fields to be searched as established in the database table. The text search for the selected items allows the user to find a specific report(s) containing the item of interest.

Figure 13:
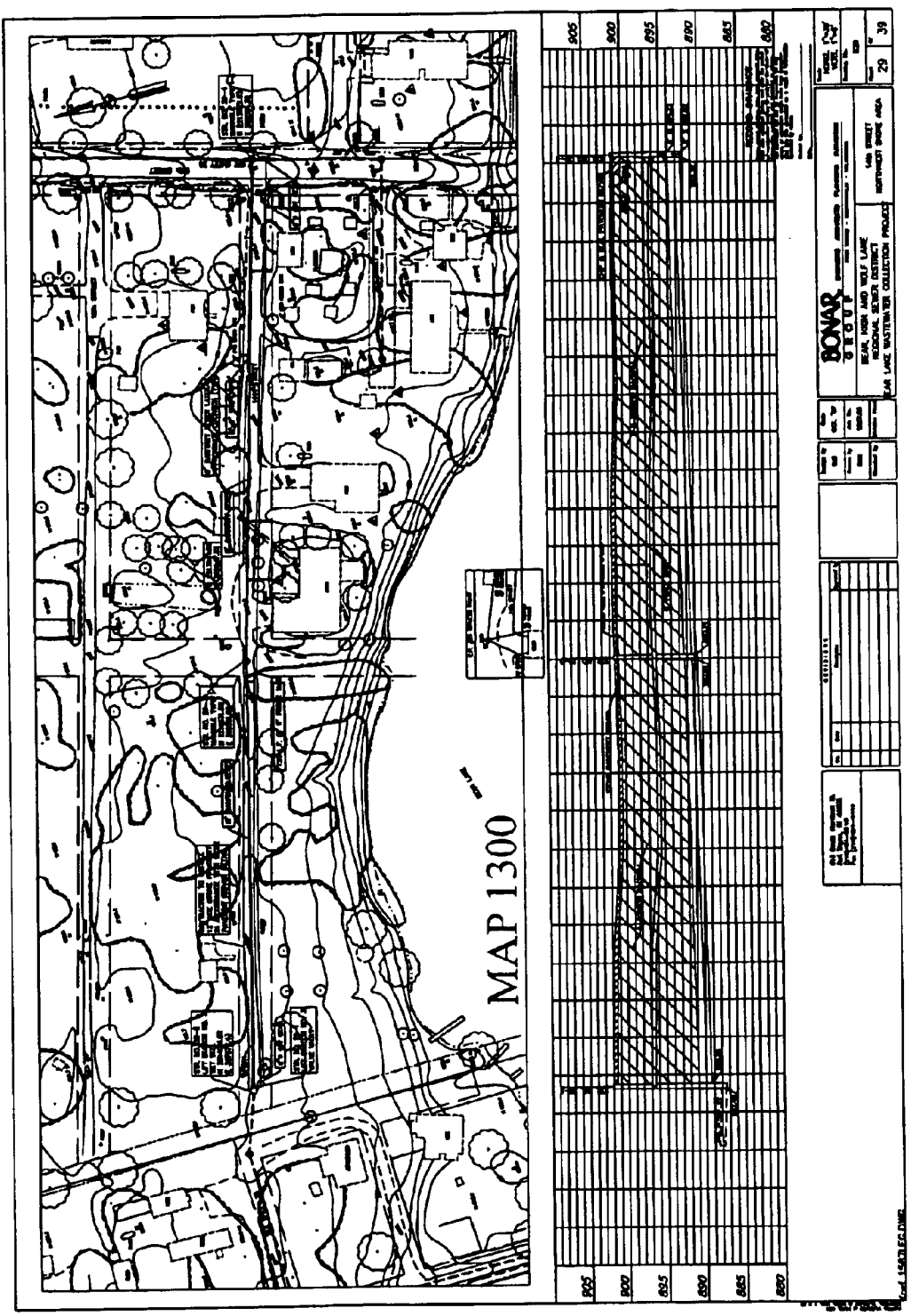
Figure 14:
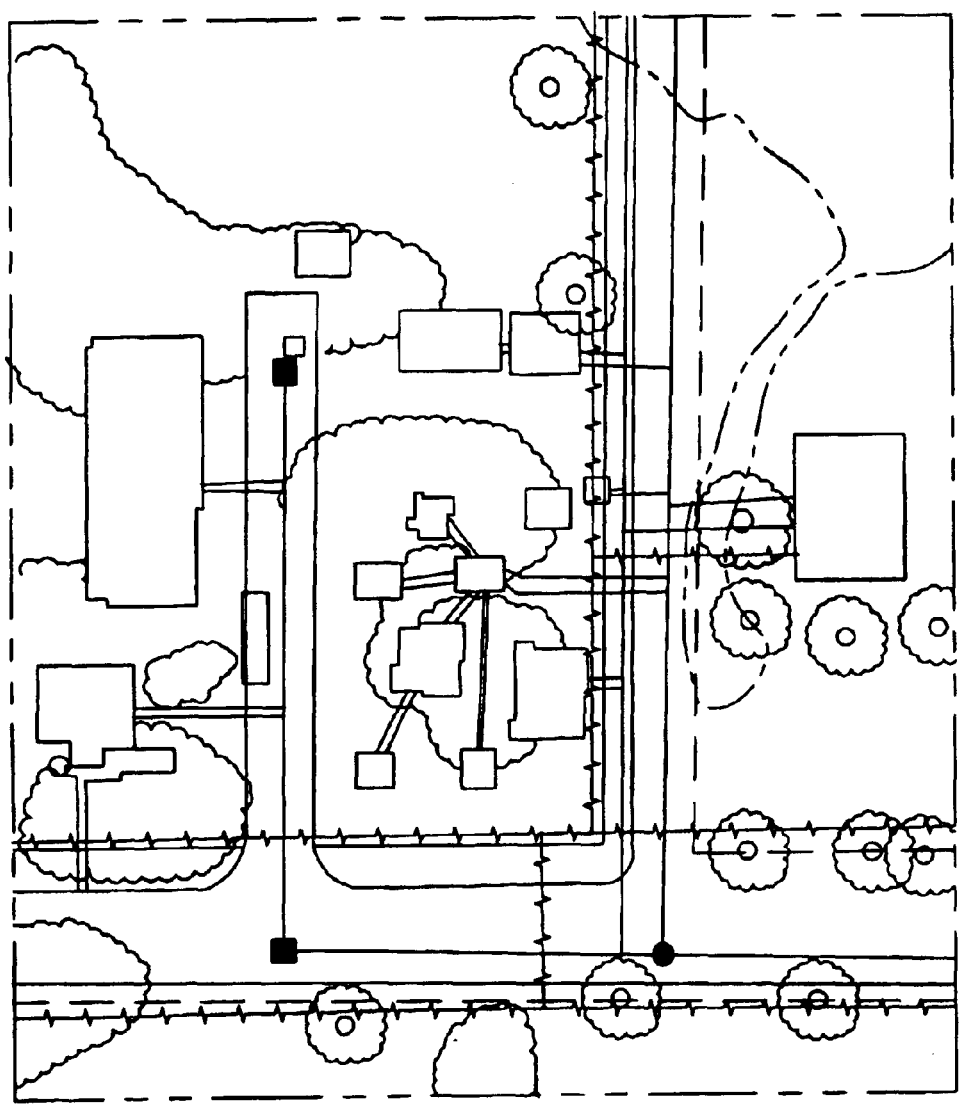
FIG. 14 is an enlarged view of a portion of FIG. 13.

FIGS. 1–13 show a representative community map showing the various instances of utility and/or community features that may be combined and cross-referenced. FIG. 1 shows overview map 100 of the community and relative location of the more detailed maps 200, 300, 400, 500, 600, 700, 800, 900, 1000, 1100, 1200, 1300 of FIGS. 2–13. Finally, FIG. 14 shows an enlarged portion of FIG. 13 showing several of the types of utility mappings. This application also includes an Exhibit in the form of a computer readable CD-ROM having inter alia several maps in Adobe PDF format These maps have both utility markings (e.g., sanitary and stormwater sewers; electrical, cable, telephone, gas lines, etc.), physical structure markings (e.g., fences, mailboxes, posts, yard lights, flag poles, gas tanks, monuments, wells, septic tanks, grinder pumps, valves, sanitary manholes, street signs, light poles, satellite dishes, antennas, basketball goals, pedestals, etc.), geographic markings (e.g., culverts, shore lines, marshes, trees, bushes, etc.), street markings (e.g., roads, railroads, buildings, landmarks, traffic lights, etc.), and political markings (e.g., rights of way, easements, property lines, etc.). The markings may have written identifying material on the map itself. Each of these markings may additionally have associated information which is accessible to through viewer by clicking or activating the map marking. Such information may be in the form of a data sheet scanned into a machine readable format, or alternatively may be a computer generated format that provides particular information.

The result of the inventive process is that the files generated from the processes above may be consolidated onto a compact disc (CD) that enables a user the flexibility to always have the community information with them in a compact format viewable from any computer and possibly from a PDA. For example, in the representation of the Figures and Exhibit to this application, all of the associated PDF and other data files may be included on a single CD-ROM for access from a computer in an office. For a field worker needing such material in a portable form, a subset of that CD-ROM files may be loaded onto a PDA, with some of the associated data files being either accessible on the PDA itself or via a wireless link to a server computer possibly over the Internet.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A computer for providing a community map of a plurality of types of utility resources, said computer comprising:

a display;

a processor and memory coupled to and operating said display;

software associated with said processor, said software containing instructions for displaying a graphic map with references to a plurality of types of utility resources, said software also including instructions that associate utility instance data relating to instances of the utility resources and display the utility instance data on said display.

2. The computer of claim 1 wherein said software also includes instructions that display references to a plurality of types of community resources, said software also including instructions that associate instance data relating to instances of community resources and display the data on said display.

3. The computer of claim 1 wherein said software also includes instructions for searching the utility instance data.

4. The computer of claim 1 wherein said software also includes instructions for accessing operational data relating to a selected utility resource.

5. The computer of claim 4 further comprising a wireless communication device adapted to receive operational information from the selected utility resource.

6. In computer, a method of creating a community map of a plurality of types of utility resources, said method comprising the steps of:

associating a plurality of maps of utility resources into a single graphic representation;

associating utility instance data with each utility resource; and providing a link between positions on the graphic representation and the utility instance data that enables display of the utility instance data when a position on the graphic representation corresponding to a utility resource is activated.

7. The method of claim 6 wherein said step of associating a plurality of maps includes a map of community resources, and said method further comprising the step of associating community instance data with each community resource, and providing a link between positions on the graphic representation and the community instance data that enables display of the community instance data when a position on the graphic representation corresponding to the community resource is activated.

8. The method of claim 6 further comprising the step of searching the utility instance data.

9. The method of claim 6 further comprising the step of accessing operational data relating to a selected utility resource.

10. The method of claim 9 further comprising using a wireless communication device to receive operational information from the selected utility resource.

11. A machine-readable program storage device for storing encoded instructions for a method of creating a community map of a plurality of types of utility resources, said method comprising the steps of:

associating a plurality of maps of utility resources into a single graphic representation;

associating utility instance data with each utility resource; and providing a link between positions on the graphic representation and the utility instance data that enables display of the utility instance data when a position on the graphic representation corresponding to a utility resource is activated.

12. The machine-readable program storage device of claim 11 wherein said method includes a step of associating a plurality of maps includes a map of community resources, and said method further comprises the step of associating community instance data with each community resource, and providing a link between positions on the graphic representation and the community instance data that enables display of the community instance data when a position on the graphic representation corresponding to the community resource is activated.

13. The machine-readable program storage device of claim 11 further comprising the step of searching the utility instance data.

14. The machine-readable program storage device of claim 11 wherein said method further comprises the step of accessing operational data relating to a selected utility resource.

15. The machine-readable program storage device of claim 14 wherein said method further comprises using a wireless communication device to receive operational information from the selected utility resource.

* * * * *